United States Patent
Sheldon et al.

(10) Patent No.: US 10,764,179 B2
(45) Date of Patent: Sep. 1, 2020

(54) LOOK UP TABLE BASED MATCH ACTION PROCESSOR FOR DATA PACKETS

(71) Applicant: CORSA TECHNOLOGY INC., Ottawa (CA)

(72) Inventors: Stacey Sheldon, Ottawa (CA); Jonathan Sewter, Kanata (CA); Peter Bengough, Kanata (CA)

(73) Assignee: CORSA TECHNOLOGY INC. (CA)

( * ) Notice: Subject to any disclaimer, the term of this patent is extended or adjusted under 35 U.S.C. 154(b) by 178 days.

(21) Appl. No.: 15/654,093

(22) Filed: Jul. 19, 2017

(65) Prior Publication Data

US 2019/0028391 A1 Jan. 24, 2019

(51) Int. Cl.
*H04L 12/741* (2013.01)
*H04L 12/747* (2013.01)
*H04L 12/743* (2013.01)

(52) U.S. Cl.
CPC ............ *H04L 45/745* (2013.01); *H04L 45/54* (2013.01); *H04L 45/74* (2013.01); *H04L 45/742* (2013.01); *H04L 45/7453* (2013.01)

(58) Field of Classification Search
CPC ....... H04L 45/745; H04L 45/54; H04L 45/74; H04L 45/742; H04L 45/7453
See application file for complete search history.

(56) References Cited

U.S. PATENT DOCUMENTS

| | | | | |
|---|---|---|---|---|
| 6,567,408 B1 * | 5/2003 | Li | ........................ | H04L 12/5601 370/395.31 |
| 6,801,985 B1 * | 10/2004 | Comisky | ................. | G06F 15/17 709/216 |
| 7,269,348 B1 * | 9/2007 | Tse-Au | ............... | H04Q 11/0005 398/25 |
| 7,554,980 B1 * | 6/2009 | Yeh | ......................... | H04L 45/00 370/392 |
| 2002/0110122 A1 * | 8/2002 | Ramfelt | ................ | H04L 45/502 370/389 |

(Continued)

OTHER PUBLICATIONS

Open Networking Foundation, Open Flow Switch Specification, Version 1.3.0 (Wire Protocol 0x04), 2012 (106 pages).

(Continued)

*Primary Examiner* — Christopher M Crutchfield
*Assistant Examiner* — Tito Q Pham
(74) *Attorney, Agent, or Firm* — Barnes & Thornburg LLP

(57) ABSTRACT

A packet sub-engine coupled to a packet buffer determines which of multiple look up tables (LUTs) is to be searched for a matching entry that matches a received data packet. Each LUT corresponds to a different type of packet handling action and includes multiple entries, each with a match field and a corresponding collection of one or more actions for handling packets that match the match field. The packet sub-engine searches the determined LUT for a matching entry, processes the received data packet according to the action(s) in the matching entry, and determines whether a further LUT is to be searched for a further matching entry. The processed data packet is provided as an output if no further LUT is to be searched, or otherwise the packet sub-engine searches the further LUT and further processes the processed packet according to the action(s) in the further matching entry.

20 Claims, 7 Drawing Sheets

(56) References Cited

U.S. PATENT DOCUMENTS

| | | | |
|---|---|---|---|
| 2005/0152354 A1* | 7/2005 | Abel | H04L 47/10 370/389 |
| 2005/0281277 A1* | 12/2005 | Killian | H04L 45/22 370/412 |
| 2007/0086337 A1* | 4/2007 | Li | H04L 45/742 370/229 |
| 2018/0262556 A1* | 9/2018 | Firestone | H04L 49/70 |

OTHER PUBLICATIONS

McKeown, et al., "OpenFlow: Enabling Innovation in Campus Network," Whitepaper, Mar. 14, 2008 (6 pages).

Bosshart, et al., "Forwarding Metamorphosis: Fast Programmable Match-Action Processing in Hardware for SDN," Aug. 12, 2013 (12 pages).

Bosshart, et al., PowerPoint Presentation "Forwarding Metamorphosis: Fast Programmable Match-Action Processing in Hardware for SDN," Aug. 12, 2013 (27 pages).

* cited by examiner

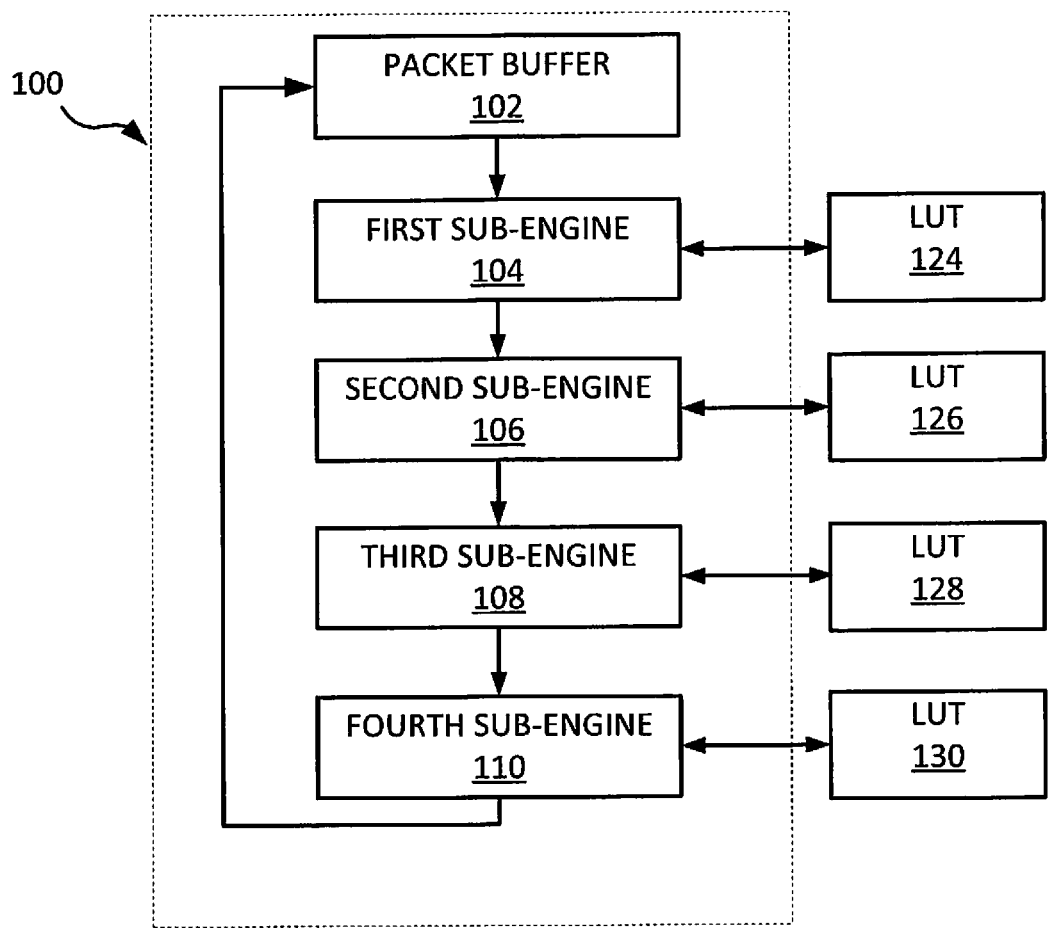
FIG. 1A: Prior art

LOOK UP TABLE BASED MATCH ACTION PROCESSOR FOR DATA PACKETS

TECHNICAL FIELD

The embodiments herein generally relate to data communications and in particular to methods and apparatus for data packet forwarding and handling by matching a packet to a packet action using look up tables.

BACKGROUND

Data traffic is composed of data packets. Data packets can be organized according to various standard data protocols such as Transmission Control Protocol (TCP) or File Transfer Protocol (FTP), for example. A data packet is typically organized into a header and a payload. The header contains information about the packet, for example: source and destination addresses, protocol type or packet length. The payload is the actual data to be transferred. As a data packet is passed through a communication network from source to destination it is typically forwarded multiple times by intermediate nodes in the communication network until it reaches its final destination. Intermediate nodes could include, for example, routers, switches or firewalls. Packet handling can involve processing of the header information or the payload itself.

Packets can be handled using general purpose processors or specialized network processors with internal architectures optimized for network centric operation.

SUMMARY

Illustrative embodiments are disclosed by way of example herein.

According to one aspect of the present disclosure, a multi-pass packet processor includes: a memory to store a plurality of look up tables, each look up table corresponding to a different type of packet handling action and comprising a plurality of entries, each of said entries including a match field and a corresponding collection of one or more packet handling actions specifying how data packets that match the match field are to be handled; a packet buffer to store received data packets; a packet sub-engine, coupled to the memory and to the packet buffer, to receive the data packets from the packet buffer, to determine for a received data packet which of the plurality of look up tables is to be searched for a matching entry, to search the determined look up table for a matching entry, to process the received data packet according to the collection of actions in the matching entry, to determine whether a further look up table of the plurality of look up tables is to be searched for a further matching entry, and to return the processed data packet to the packet buffer where a further look up table is not to be searched, and to search the further look up table for a further matching entry and further process the processed packet according to the collection of actions in the further matching entry where a further look up table is to be searched for a matching entry.

According to a further aspect, a multi-pass packet processing method involves: storing received data packets in a packet buffer; determining, by a packet sub-engine that is coupled to the packet buffer, which of a plurality of look up tables is to be searched for a matching entry that matches a received data packet, each look up table corresponding to a different type of packet handling action and comprising a plurality of entries, each of said entries including a match field and a corresponding collection of one or more packet handling actions specifying how data packets that match the match field are to be handled; searching, by the packet sub-engine, the determined look up table for a matching entry; processing, by the packet sub-engine, the received data packet according to the collection of actions in the matching entry; determining, by the packet sub-engine, whether a further look up table of the plurality of look up tables is to be searched for a further matching entry; and providing the processed data packet as an output of the packet sub-engine where a further look up table is not to be searched, and searching the further look up table by the packet sub-engine for a further matching entry and further processing the processed packet by the packet sub-engine according to the collection of actions in the further matching entry where a further look up table is to be searched for a matching entry.

Other aspects and features of embodiments of the present disclosure will become apparent to those ordinarily skilled in the art upon review of the following description.

BRIEF DESCRIPTION OF THE DRAWINGS

The embodiments herein will be better understood from the following detailed description with reference to the drawings, in which:

FIG. 1A is a block diagram of a fixed length Match Action Processor (MAP).

DETAILED DESCRIPTION

Figure 1B:
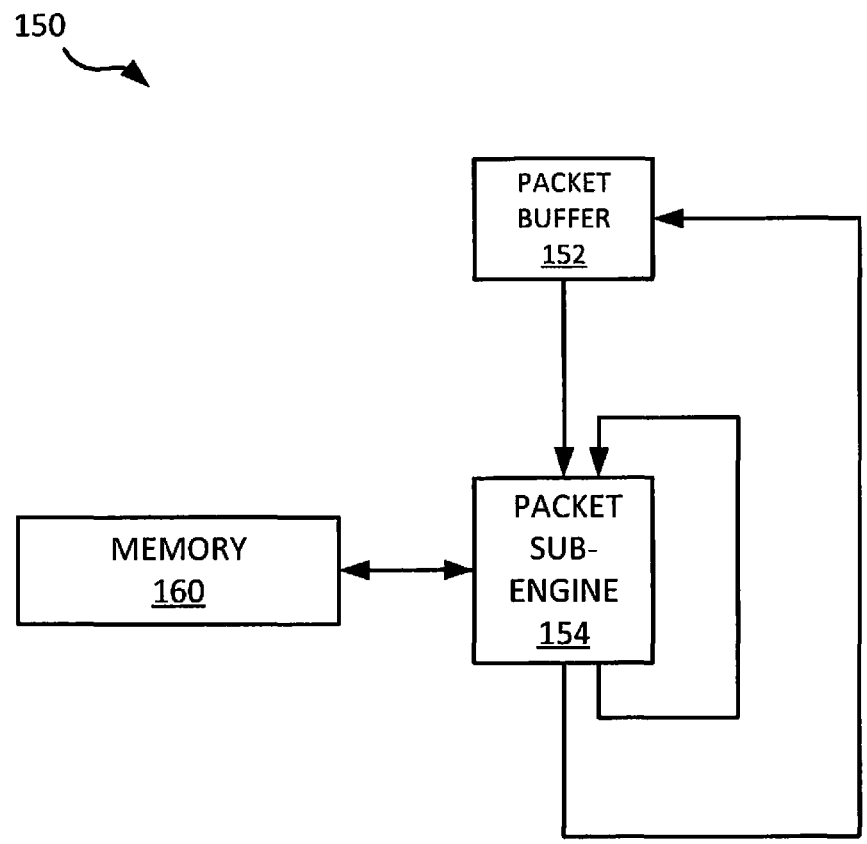
FIG. 1B is a block diagram of a multi-pass match action processor according to an embodiment.

One approach to packet handling uses a "match action" Look Up Table (LUT) to determine how a packet is to be handled. A match action LUT comprises multiple entries. Each entry comprises a match field or multiple match fields and a corresponding collection of packet handling actions, which could include one or more packet handling actions. An entry could comprise as few as one packet handling action. An entry might also additionally comprise a match priority.

In match action processing, packet handling is determined by searching the match action LUT for a match between selected portions of a packet's header information (a "key") and the LUT's match field(s). The packet is handled according to the action or collection of actions in the matching entry. The header information used to construct the key could include, for example, one or both of a packet's source and destination MAC (Media Access Controller) addresses, one or both of its source and destination IP addresses, and/or its destination TCP port address (e.g. port 80 corresponding to Hypertext Transfer Protocol (HTTP)). A match might not be an exact or complete match. For example, only certain bits in a field might be matched (e.g. only the first 24 bits of a source address might be matched).

An individual packet action could be, for example, forwarding the packet to a particular egress (output) port, rewriting a portion of the packet's header (e.g. a traffic class bit), dropping the packet, specifying a next match action processing step or specifying that packet processing is complete.

Herein, "match action" or "match action operation" refers to the entire process of determining a key, accessing a LUT to find a matching entry, and then determining the action(s) to be performed for a packet. An "action" or "packet handling action" is the action that has been determined from the LUT and is to be performed on a packet.

A match action LUT entry might also comprise a match priority. If multiple matching entries in the LUT are found, then the matching entry with the highest priority could be chosen. The Openflow protocol describes a common form of match action LUT processing.

Packet handling might not be limited to a single match action operation. As part of its handling, a sequence of match action operations could be performed on a packet.

Packet actions could be executed immediately after they are retrieved from the LUT or executed after all the actions from a sequence of match action operations have been determined. In the latter case, an indication of each packet action could be appended to a packet as metadata for example, so that the action(s) can be performed after all match actions have been completed. A group of actions that are executed immediately after they are retrieved is often referred to as an "action list". For example, a packet's header information could be rewritten immediately after the action list is retrieved from the LUT and before the next match action operation in a sequence of match action operations is performed.

A group of actions that are appended and executed after all match action operations are complete is often referred to as an "action set". Multiple action sets could be appended to a packet header as metadata, for example, until all match action processing is complete.

In the Openflow protocol there is only a single action set for a packet. Each type of action only occurs once in the action set, and the actions are executed in a specified order. The action set is continually updated by new match action operations and previously written actions are over-written with newer versions until all match action operations are complete. There is only ever one action set, and once instance of each type of action. The above examples of forwarding a packet to a particular egress (output) port, rewriting a portion of a packet header, dropping a packet, and specifying a next match action processing step or specifying that packet processing is complete, are illustrative of different types of actions.

The appended action set for any packet in this example could then be executed after completion of the last match action operation for the packet.

FIG. 1A is a block diagram of a fixed length Match Action Processor (MAP). Fixed length MAP 100 comprises packet buffer 102 and packet processing sub-engines 104, 106, 108, 110. Sub-engines 104, 106, 108, 110 are paired with respective Look Up Tables (LUTs) 124, 126, 128, 130. Each of sub-engines 104, 106, 108, 110 performs a single match action. Look Up tables 124, 126, 128, 130 store the action sets for their respective sub-engines. When a packet is received by one of sub-engines 104, 106, 108, 110 the respective LUT 124, 126, 128, 130 is searched for a matching entry. If a matching entry is found, the matching action set or list is retrieved from and provided to respective sub-engine 104, 106, 108, 110. If multiple matches are found then the match with the highest priority is provided. If no matches are found then the packet might be sent to the MAP's controller (not shown) for further processing.

Sub-engines 104, 106, 108, 110 are connected in series in what is commonly known as a processing "pipeline", wherein a processing sub-engine receives a packet from the preceding processing sub-engine in the pipeline and provides a modified packet to the next processing sub-engine in the pipeline. For example, first sub-engine 104 could receive a packet from packet buffer 102, modify the packet header with a first action list and provide it to second sub engine 106. Second sub-engine 106 could receive the packet, modify it again with a second action list and provide it to third sub-engine 108. Third sub-engine 108 could receive the packet, modify it again with a third action list and provide it to fourth sub-engine 110. Fourth sub-engine 110 could next receive the packet, modify it with a fourth action list and provide it to packet buffer 102. Packet buffer 102 could then pass the packet on for disposition.

Each of sub-engines 104, 106, 108, 110 might modify the packet with a different action set or list. The disposition of the packet might be based on the cumulative packet actions from each of sub-engines 104, 106, 108, 110.

An advantage of the pipelined architecture of fixed length MAP 100 is that multiple packets can be processed simultaneously. For example, each of sub-engines 104, 106, 108, 110 could each process a different packet at the same time. However, a limitation of a fixed length MAP such as MAP 100 is its number of sub-engines. The maximum number of possible match action operations could be limited to the number of MAP sub-engines. For example, MAP 100 could only perform a maximum of four match action operations on a single packet. MAP 100 might not be able to accommodate packet handling applications involving a greater number of match action operations than four.

FIG. 1B is a block diagram of a multi-pass match action processor according to an embodiment. Multi-pass MAP comprises packet buffer 152, sub-engine 154 and memory 160. Sub-engine 154 is operatively coupled to memory 160 and packet buffer 152.

Memory 160 stores the LUTs for all match action operations performed by MAP 150. Memory 160 could be a Content Addressable Memory (CAM) or a Ternary Content Addressable Memory (TCAM). Memory 160 could also be a DRAM (Dynamic Random Address Memory or an SRAM (Static Random Access Memory). DRAM memories might be augmented with a dedicated search processor to implement an algorithmic search engine. In some embodiments memory 160 is a combination of different types of memory, for example, it could be combination of a TCAM, a DRAM and an SRAM.

Packet buffer 152 and sub-engine 154 could be implemented in an Application Specific Integrated Circuit (ASIC) or as a Field Programmable Gate Array (FPGA), for example.

An engine or sub-engine as referenced herein is intended to denote a component that is implemented using a processor or other circuitry, which may be configured, by executing software, to perform operations or provide features as disclosed herein. The sub-engine 154, for example, could equivalently be characterized as a processor implementing a sub-engine. An ASIC or FPGA implementation as noted above is illustrative of such intended connotations of "engine" or "sub-engine".

Sub-engine 154 performs a single match action operation. When packet buffer 152 receives a new unprocessed packet it forwards the packet to sub-engine 154, or the sub-engine 154 accesses the packet buffer 152 to retrieve the new packet. When the new packet is received by sub-engine 154 a first match action operation is performed. The LUT for the first match action operation is stored in memory 160 and is searched for a matching entry based on the packet's header information. The action(s) from the matching entry, which could be the matching entry with the highest priority if there are multiple matching entries, are retrieved. Sub-engine 154 then either performs the action(s) such as modifying the packet's header, or includes an indication of each action in the packet, by appending such indication(s) to the packet as metadata.

If there are no additional match action operations to perform then the packet is returned to packet buffer 152.

If, however, there are additional match actions to perform then the packet is further processed by the sub-engine 154. For example, the processed packet could be returned to the input of sub-engine 154 and a next match action operation is performed. The LUT for the second match action operation stored in memory 160 is searched for a matching entry based on the packet's header information and the action(s) from the matching entry, which could be the matching entry with the highest priority if there are multiple matching entries, are retrieved. Sub-engine 154 again either modifies the packet's header according to the action list or updates the action set previously appended to the packet and outputs the packet.

If the packet processing application requires a sequence of "M" match action operations then the packet passes through or is otherwise processed by sub-engine 154 a total of "M" times. Each match action operation performed on the packet by sub-engine 154 could access a different LUT in the memory 160.

The particular LUT to access could be determined based on content of a received data packet, by either or a combination of an application identifier and a table identifier, for example.

The application identifier could identify a specific instantiation of a particular packet handling application. Examples of different packet handling applications include: layer 2 Virtual Local Area Network (VLAN), layer 2 Ethernet switching, layer 3 routing including IPv4 routing and IPv6 routing, and Quality of Service (QoS) processing. There could be multiple instantiations of the same application. For example, packets for multiple VLANs could be handled and forwarded by a multi-pass MAP 150. Each instantiation would be assigned a unique application ID.

The application identifier could be appended to the packet as metadata or otherwise included in a packet. The application identifier could be created by an underlay processor (not shown) prior to the packet's arrival at packet buffer 152.

A table identifier could be used to identify which particular LUT in a set of LUTs associated with an application is to be queried. In an embodiment, there is a one to one correspondence between a LUT and a match action operation, in which case the table identifier also identifies the match action operation that is to be performed. The table identifier could be appended to the packet as metadata or otherwise included in a packet.

The table identifier for a next query and match action operation could be determined by the previous match action operation. Match action operations and table queries can be performed in an arbitrary sequence.

Figure 1C:
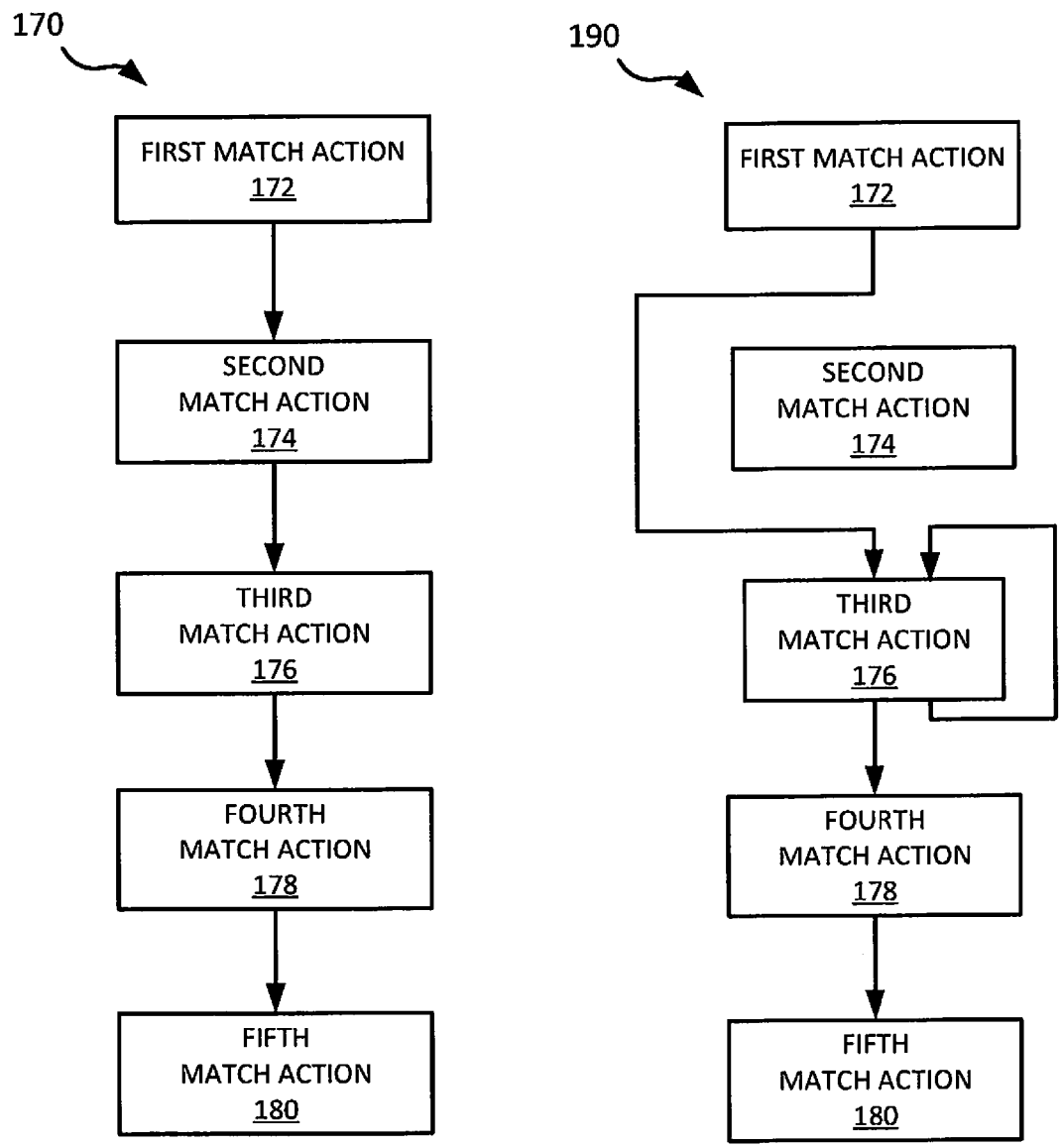
FIG. 1C includes flow diagrams of example match action sequences for a specific application.

FIG. 1C includes flow diagrams of example match action sequences for a specific application. The example match action sequences 170 comprises a set of five match action operations 172, 174, 176, 178, 180. In match action sequence 170 the five match action operations 172, 174, 176, 178, 180 are performed sequentially. In match action sequence 190 match action operations 172, 174, 176, 178, 180 are performed out of sequence relative to the example match action sequence 170. Match action 172 is performed first, followed by match action operation 176, followed by a second performance of match action 176, followed by match action 178, followed by match action 180. In match action sequence 190 match action operation 174 is not actually performed and its associated LUT is never queried.

The flow diagrams in FIG. 1C may be useful in illustrating how a multi-pass MAP 150 could be more flexible than the fixed length MAP 100.

For example, the maximum length of a match action sequence in multi-pass MAP 150 is not limited to the number of sub-engines. In a fixed length MAP, a separate sub-engine is implemented for each match action. Five separate sub-engines would be implemented in a fixed length MAP for the match action sequence 170. However, in a multi-pass MAP, a packet could be passed through one sub-engine, such as sub-engine 154 in FIG. 1B, multiple times. For example, if a match action sequence was of length "M", then the packet could recirculate through multi-pass MAP 150 "M" times. A single sub-engine could be used to implement the match action sequence 170 or the match action sequence 190 in a multi-pass MAP.

In addition, a match action sequence comprising as few as one match action could be efficiently accommodated in a multi-pass MAP such as multi-pass MAP 150 in FIG. 1B. For example, if an application required only a single match action then sub-engine 154 could perform that single match action and then return the packet to packet buffer 152. Implementing a single match action in a fixed length MAP with more than one sub-engine, however, could effectively "waste" all but one of the sub-engines since only one sub-engine would ever actually perform its match action.

Multi-pass MAP 150 could execute match actions for multiple, different packet handling applications on a packet by packet basis. For example, sub-engine 154 could first perform a first sequence of match action operations corresponding to a first application on a first packet and next perform a second sequence of match action operations corresponding to a second application on a second packet. Thus a single physical multi-pass MAP 150 could be virtualized into multiple, virtual MAPs, each running a different application.

Figure 2:
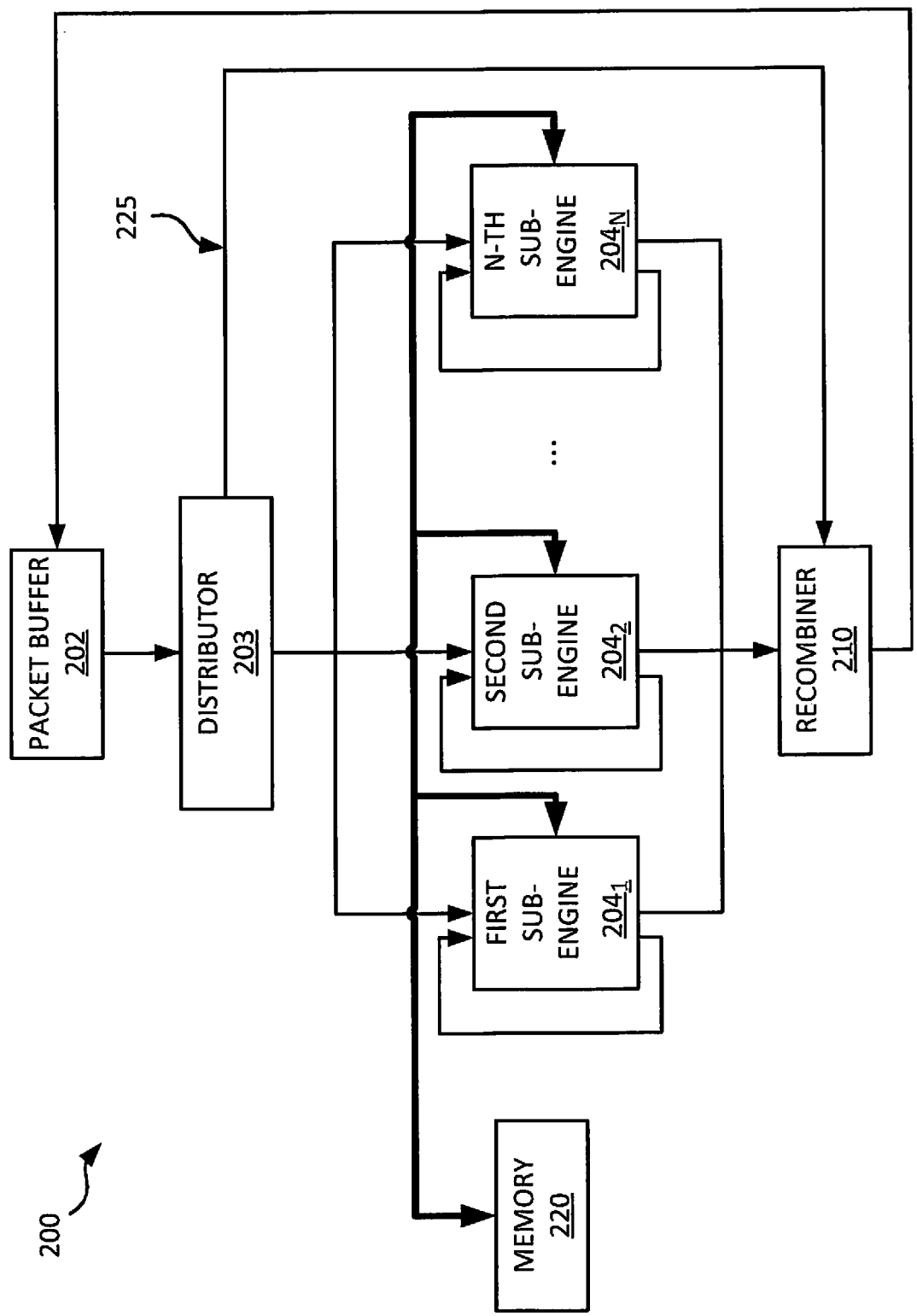
FIG. 2 is a block diagram of another multi-pass Match Action Processor according to another embodiment.

FIG. 2 is a block diagram of another multi-pass MAP. Multi-pass MAP 200 comprises packet buffer 202, packet distributor 203, "N" packet processing sub-engines $204_1$, $204_2$, ... $204_N$ and packet recombiner 210. Packet processing sub-engines $204_1$, $204_2$, ... $204_N$ are arranged in parallel and in one embodiment they are identical with identical processing latencies. Processing latency is the time delay between a packet's arrival at a sub-engine and the completion of a match action operation. In one embodiment N=12. Sub-engines $204_1$, $204_2$, ... $204_N$ are operatively coupled to memory 220 and packet buffer 202. Sub-engines $204_1$, $204_2$, ... $204_N$ each perform a single match action operation. Memory 220 stores the look up tables for all match action operations performed by MAP 200. Memory 220 could be a Content Addressable Memory (CAM) or a Ternary Content Addressable Memory (TCAM). Memory 220 could also be a DRAM (Dynamic Random Address Memory or an SRAM (Static Random Access Memory). DRAM memory might be augmented with a dedicated search processor to implement an algorithmic search engine. In some embodiments memory 220 is a combination of different types of memory, for example, it could be combination of a TCAM, a DRAM and an SRAM.

Packet buffer 202, packet distributor 203, packet sub-engines $204_1$, $204_2$, ... $204_N$, and packet recombiner 210 could be implemented as part of an FPGA or an ASIC, for example.

When a new, unprocessed packet is received by packet buffer 202 it is passed to packet distributor 203. Distributor 203 selects which of sub-engines $204_1$, $204_2$, ... $204_N$ is to perform match action processing for the packet based on a distribution function and passes the packet to the selected sub-engine. In one embodiment, a round robin distribution function is used and a packet is assigned to the next idle sub-engine $204_1$, $204_2$, ... $204_N$ in a fixed pre-determined sequence. In another embodiment sub-engines $204_1$, $204_2$, ... $204_N$ are dedicated to a particular application and the selected sub-engine is the sub-engine dedicated to the packet's application.

Distributor 203 might not pass the entire packet to selected sub-engine $204_1$, $204_2$, ... $204_N$. It might instead separate the packet's header information from the payload and only pass the header to the selected sub-engine, for example. It might pass the payload information to recombiner 210 over a separate path 225 that bypasses the sub-engines $204_1$, $204_2$, ... $204_N$ and match action processing. Recombiner 210 might recombine packets received from sub-engines $204_1$, $204_2$, ... $204_N$ into a packet flow according to a recombining function. In embodiments in which packet headers and payloads are separated, recombiner 210 might also recombine a packet's header and payload once the packet's match action sequence is complete. Packets could be separated into parts for match action processing in other ways than separating headers and payloads.

When the new packet is received by the selected sub-engine $204_1$, $204_2$, ... $204_N$ a first match action operation is performed. The LUT for the first match action operation is stored in memory 220 and is searched for a matching entry based on the packet's header information. The action(s) from a matching entry, or the highest priority matching entry if there are multiple matching entries, are retrieved from memory 220 and delivered to the selected sub-engine $204_1$, $204_2$, ... $204_N$. Selected sub-engine $204_1$, $204_2$, ... $204_N$ either performs the action(s) such as modifying the packet's header or includes an indication of each action in the packet, by appending such indication(s) of the action set to the packet in an embodiment, and outputs the packet.

If there are additional match actions to perform, the modified packet is returned to the input of the previously selected sub-engine $204_1$, $204_2$, ... $204_N$ and a next match action operation is performed. The LUT for the second match action operation stored in memory 220 is searched for a matching entry based on the packet's header information and the actions from the highest priority matching entry are retrieved. Selected sub-engine $204_1$, $204_2$, ... $204_N$ again either performs the action(s) such as modifying the packet's header or includes an indication of each action in the packet, by updating the previously appended action set in an embodiment, and outputs the packet.

If the packet processing application requires a sequence of "M" match action operations then the packet passes through the selected sub-engine "M" times. Each different match action operation performed on the packet by a sub-engine $204_1$, $204_2$, ... $204_N$ accesses a different LUT, as determined by the selected sub-engine, in an embodiment.

The particular LUT to access could be determined based on packet content, such as either or a combination of an application identifier and a match action identifier in each packet. Sub-engines $204_1$, $204_2$, ... $204_N$ could all process packets simultaneously and with a fixed latency.

When there are no additional match action operations to perform the packet is delivered to or otherwise obtained by recombiner 210. Recombiner 210 might recombine packets received from sub-engines $204_1$, $204_2$, ... $204_N$ into a packet flow according to a recombining function and return the packets to packet buffer 210. Recombiner 210 could restore the original packet order of a network flow as originally received at packet buffer 202. A network flow is a sequence of packets which have the same application and the same sequence of match action operations. Using a round robin distribution function for distributor 203 and fixed latency sub-engines $204_1$, $204_2$, ... $204_N$ the original packet order of a network flow might be restored by recombiner 210 returning packets to packet buffer 202 in the same sequence as they arrive at recombiner 210.

Recombiner 210 could also or instead recombine a packet header with its payload.

Multi-pass MAP 200 could be more flexible than the fixed length MAP 100 in FIG. 1A.

For example, in multi-pass MAP 200 the maximum length of a match action sequence is no longer limited to the number of sub-engines. A packet could be passed through one of sub-engine $204_1$, $204_2$, ... $204_N$ multiple times. For example, if a match action sequence was of length "M" then the packet could recirculate through multi-pass MAP 200 "M" times.

A match action sequence comprising as few as one match action could be efficiently accommodated in multi-pass MAP 200. For example, if an application required only a single match action then each of sub-engines $204_1$, $204_2$, ... $204_N$ could simultaneously perform that match action on different packets in a single pass. In each of multiple passes, multiple sub-engines $204_1$, $204_2$, ... $204_N$ could simultaneously perform a match action.

Multi-pass MAP 200 could accommodate multiple, different packet handling applications running simultaneously. For example, sub-engine $204_1$ could be running a first sequence of match action operations for a first application while sub-engine $204_2$ could be running a second sequence of match action operations for a second application. Thus a single physical multi-pass MAP 200 could be virtualized into multiple virtual MAPs, each running a different application.

The hardware utilization of an application could be controlled, by packet buffer 202 or distributor 203, by controlling the rate at which packets arrive at sub-engines $204_1$, $204_2$, ... $204_N$ from packet buffer 202. For example, utilization could be controlled to equalize or "load level" hardware utilization across multiple applications. This could aid in ensuring that one particular application does not consume a disproportionate amount of, for example, computing or memory resources. Packet buffer 202 could meter or measure arrival rates of application packets and control packet admission or distribution rates for match action processing based on their application identifier. Packet buffer 202 could have a queue into which packets awaiting processing are admitted and stored. Packet buffer 202 could read a packet's application identifier and decide whether to admit it to the queue or drop the packet. This decision could be based on a maximum average packet arrival rate for a specific application. If the packet arrival rate for a specific application is less than the maximum then the packet could be admitted to the queue. If the arrival rate exceeds the maximum then the packet could be dropped.

An application's maximum packet arrival rate could be determined based on the application's match action sequence length. For example, an application with a match action sequence length of ten might be given a maximum packet arrival rate one tenth the maximum arrival rate of an application with a match action sequence length of one. In this way both applications could be limited to approximately equal maximum amounts of computing resource.

An application's maximum packet arrival could be determined based on the application's memory bandwidth requirements. For example, referring to MAP 200, an application with a memory bandwidth requirement on memory 220 of ten times the bandwidth requirement of a second application might be given a maximum arrival rate one tenth that of the second application. In this way both applications could be limited to approximately equal maximum amounts of memory bandwidth.

Figure 3:
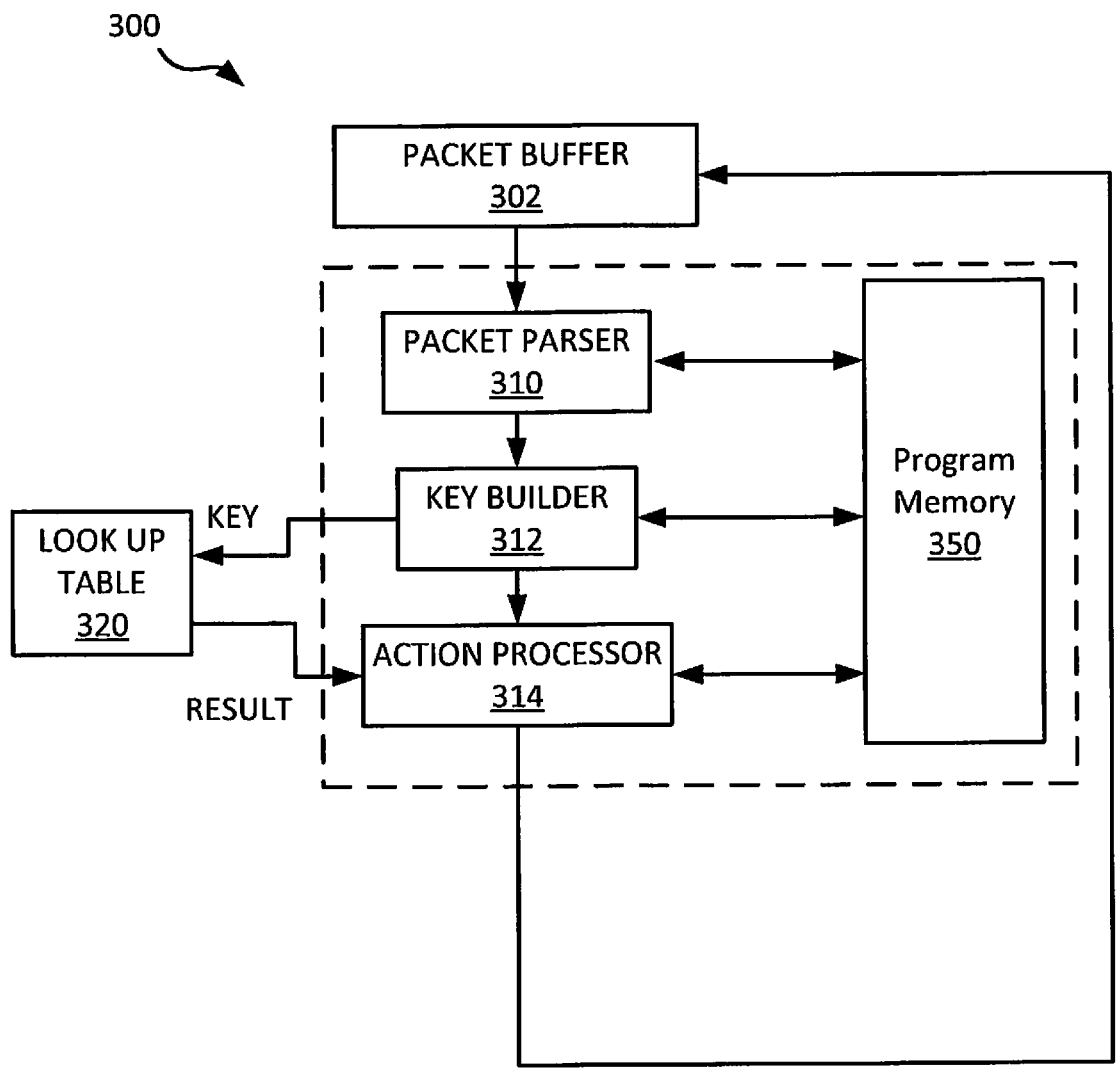
FIG. 3 is a block diagram of an example multi-pass Match Action Processor sub-engine.

FIG. 3 is a block diagram of an example design for a multi-pass MAP sub-engine such as sub-engine 154 of FIG. 1B or sub-engines $204_1$, $204_2$, ... $204_N$ of multi-pass MAP 200. Sub-engine 300 comprises packet parser 310, key builder 312, action processor 314 and program memory 350.

Figure 4:
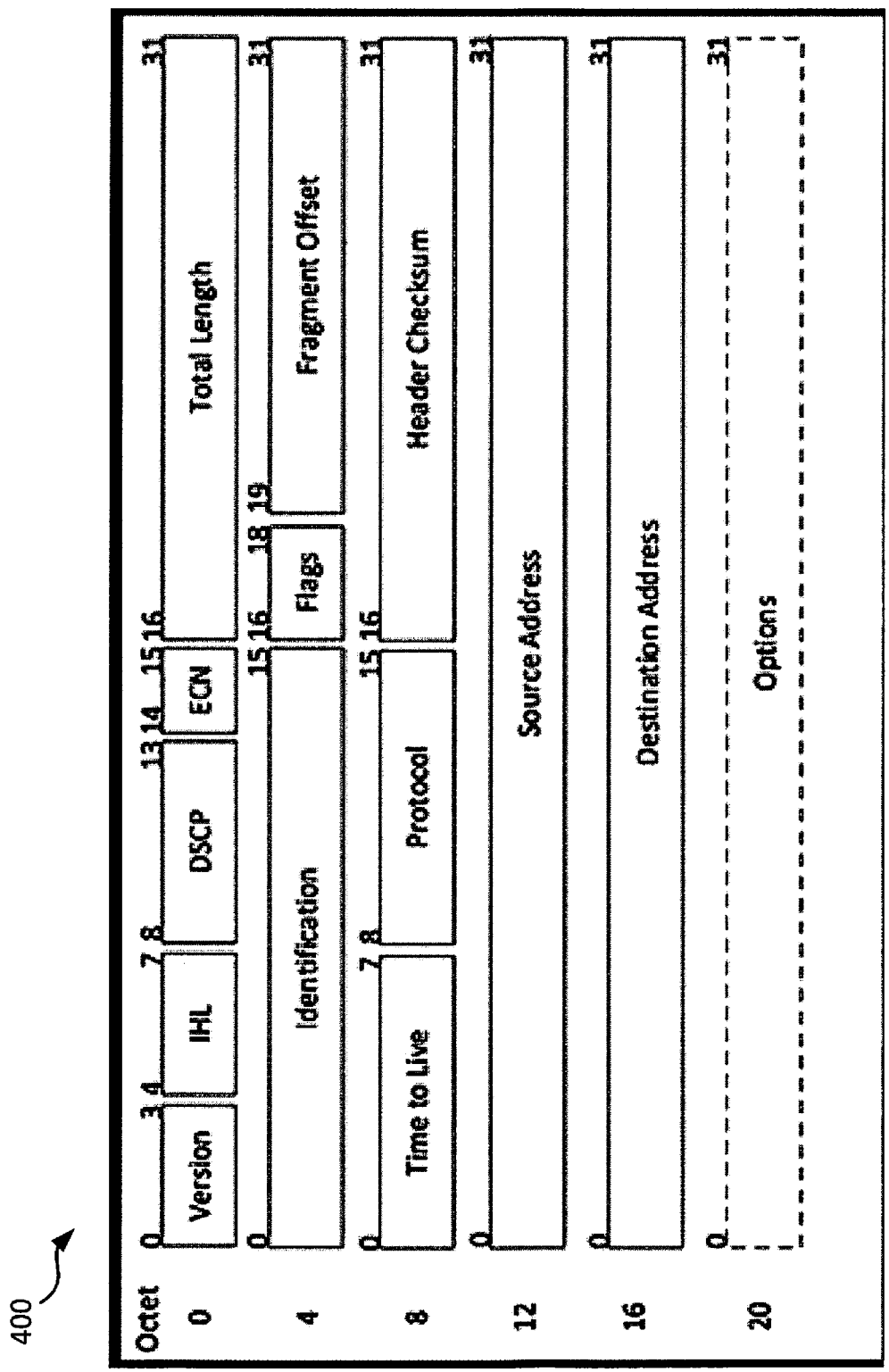
FIG. 4 is a table depicting header fields and lengths for an Internet Protocol (IP) packet.

Packet parser 310 is operatively connected to packet buffer 302. Packet parser 310 receives packets from packet buffer 302 and parses the packet's contents to identify its different header fields. A packet header is comprised of multiple fields of different bit lengths. FIG. 4 is a table 400 depicting the header fields and lengths for an IP packet. For example, an IP packet comprises multiple fields including a version field, a header length field, a Differentiated Services Code Point (DSCP) field, a total length field, a protocol field, a source address field and a destination address field. Packet parser 310 could capture the results of the parsing operation in a series of meta fields appended to the packet and describing the packet's protocol layers and the address offset of each protocol layer field, for example.

Packet parser 310 could be a block of hardwired logic that implements a decision tree.

Alternately, packet parser 310 could be programmable and receive parsing instructions from program memory 350.

Key builder 312 is operatively coupled to packet parser 310. Key builder 312 receives the packets from packet parser 310, including parsed field information, and constructs a search key from the packet's fields. Instructions on which of the packet's fields to use and how to construct the key could be received from program memory 350. A search key could be constructed from multiple fields. For example, a search key might comprise a source address, a destination address and a protocol type. The search key might also or instead be constructed by bit masking a field so that only certain bits in the field are matched. For example, a search key might be constructed from the first 24 bits of a source address. A search key could be constructed from the concatenation of multiple fields together.

Key builder 312 could be implemented as a programmable processor such as an Arithmetic Logic Unit (ALU). Instructions for how to construct the search key could be stored in program memory 350.

Key builder 312 could query Look Up Table (LUT) 320 using the search key once the search key is constructed. If a matching entry to the search key is found in LUT 320 then LUT 320 could return the corresponding action(s) from a matching entry, which could be the highest priority matching entry in the case of multiple matching entries, to action processor 314 as the "RESULT" shown in FIG. 3.

LUT 320 could be stored in an external memory and contain stored actions for different key values. LUT 320 could be stored in a CAM or a TCAM. LUT 320 could also be stored in an external DRAM (Dynamic Random Address Memory) or an internal SRAM (Static Random Access Memory). DRAM memory might be augmented with a dedicated search processor to implement an algorithmic search engine.

Action processor 314 is operatively coupled to key builder 312 and receives packets from key builder 312 and corresponding actions from LUT 320. Action processor 314 could be implemented as a programmable processor such as an Arithmetic Logic Unit (ALU). An action could be a call or a sequence of calls to various pre-existing functions. The functions could be stored in Program Memory 350 as microcode. There could be a one to one correspondence between an action and a pre-existing function.

Action processor 314 could execute received actions on a packet. An action could be, for example, to rewrite the packet's header with a value returned from LUT 320. For example, the action processor 314 could rewrite the destination MAC address with a new MAC address. An action could also or instead be to modify the packet processing flow such as to direct the packet to a next stage of processing or end the packet's processing, for example. Action processor 314 might also, or instead, append or update an action set to the packet.

Program memory 350 could be implemented as Static Random Access Memory (SRAM) embedded in an FPGA or in an external SRAM integrated circuit, for example.

Figure 5:
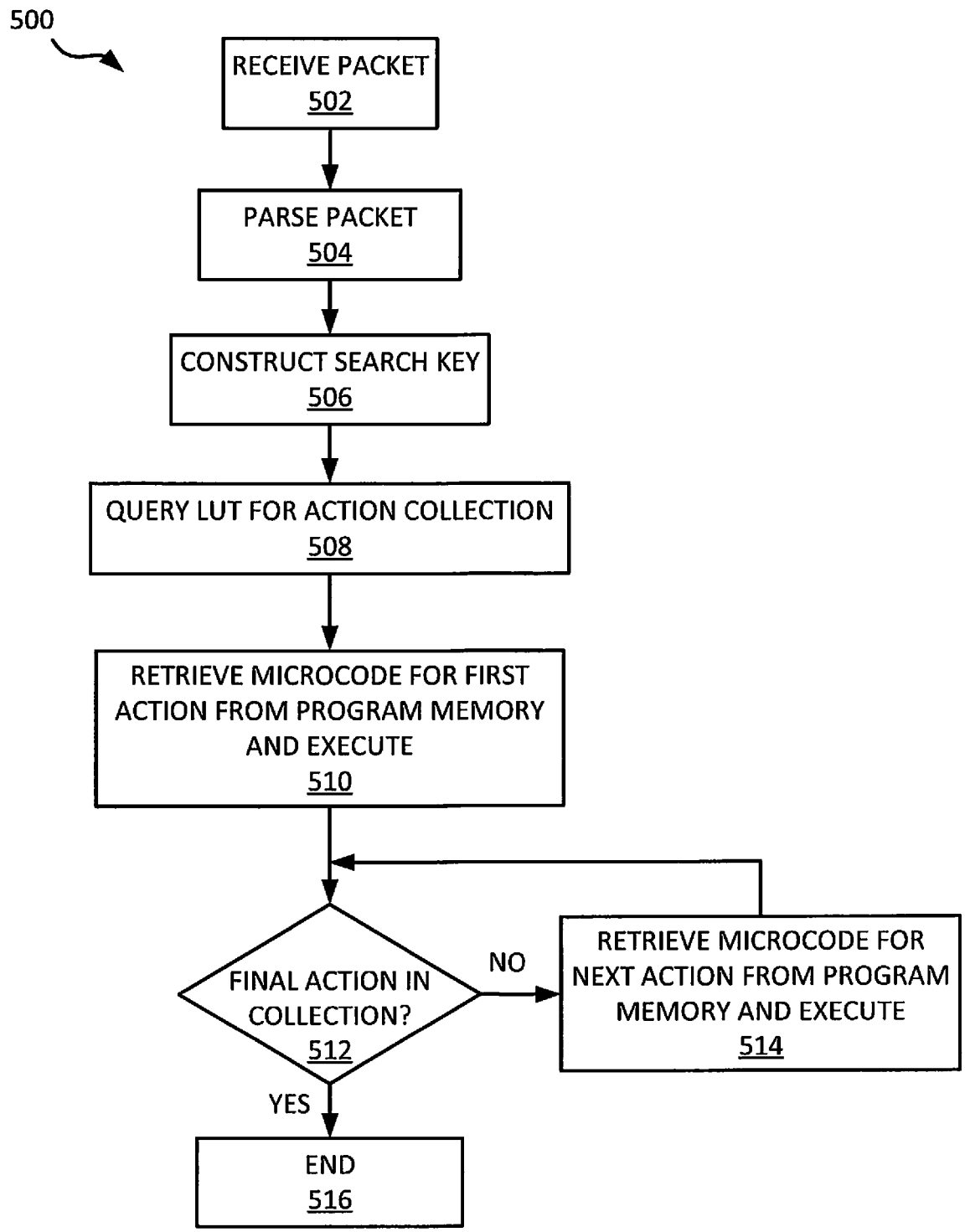
FIG. 5 is a flow diagram of an example processing flow for a match action operation.

FIG. 5 is a flow diagram of an example processing flow for a match action operation. A packet is received at 502. The packet is parsed at 504. A search key is constructed at 506. A match action LUT is queried at 508 using the key for an action list. At 510 the microcode corresponding to the first action in the action list is retrieved from program memory and executed. At 512 it is determined whether the executed action was the last action in the matching LUT entry. If the executed action is not the final action (NO at 512) then the microcode for the next action is retrieved from program memory and executed. If the executed action was the final action (YES at 512) then the match action operation ends at 516.

The method 500 is illustrative of one embodiment. Other embodiments could include additional, fewer, and/or different operations, performed in a similar or different order. In another embodiment an indication of each action and/or the action list is added to the packet instead of performing the action(s) at 512, 514, for example.

The particular embodiments described herein are intended to be non-limiting illustrative examples. In more general terms, a multi-pass packet processor such as shown in FIGS. 1B, 2, and 3 includes a memory 160, 220, 320 to store LUTs, a packet buffer 152, 202, 302 to store received data packets, and a packet sub-engine 154, $204_1$ ... $204_N$, or as shown in FIG. 3, coupled to the memory and to the packet buffer.

Each LUT corresponds to a different type of packet handling action in an embodiment, and includes multiple entries. Each entry includes a match field and a corresponding collection of one or more packet handling actions specifying how data packets that match the match field are to be handled. The packet sub-engine is configured, by executing software for example, to receive the data packets from the packet buffer, to determine for a received data packet which of the LUTs is to be searched for a matching entry, and to search the determined look up table for a matching entry. As noted elsewhere herein a matching entry need not necessarily match an entire data packet.

The packet sub-engine is further configured to process the received data packet according to the collection of actions in the matching entry. For example, the packet sub-engine could be configured to process the received data packet according to the collection of actions in the matching entry by including in the received data packet an indication of the collection of actions in the matching entry. According to another embodiment, the packet sub-engine is configured to process the received data packet according to the collection of actions in the matching entry by performing the collection of actions on the received data packet.

In a multi-pass processor, the packet sub-engine is also configured to determine whether a further look LUT is to be searched for a further matching entry, and to return the processed data packet to the packet buffer (where a further LUT is not to be searched), and to search the further LUT for a further matching entry and further process the processed packet according to the collection of actions in the further matching entry (where a further LUT is to be searched for a matching entry). In some embodiments, a processed data packet could be returned to the packet buffer (or otherwise provided as an output) even when another LUT is to be searched, and also further processed according to action(s) that are identified in a further search. Output of a processed data packet could be specified as an action in a matching LUT entry, for instance. This type of packet processing could be useful, for example, in implementing packet replication.

The packet sub-engine could be configured to determine which of the LUTs is to be searched based on one or more of an application identifier and a table identifier associated with the received data packet.

For each of multiple received data packets associated with multiple, different packet handling applications, the packet sub-engine could determine which of the LUTs is to be searched.

A multi-pass MAP could include more than one packet sub-engine, as shown by way of example in FIG. 2. In embodiments with multiple packet sub-engines, there is a packet sub-engine and at least one further packet sub-engine coupled to the memory. A distributor could also be provided, as shown by way of example at 203 in FIG. 2, coupled to the packet buffer, to the packet sub-engine, and to the further packet sub-engine(s). Such a distributor would be configured to receive the data packets from the packet buffer and to distribute the received data packets between the packet sub-engine and the further packet sub-engine(s).

A recombiner, as shown by way of example at 210 in FIG. 2, could also be coupled to the packet sub-engine and to the further packet sub-engine(s). Such a recombiner is configured to recombine processed data packets that have been processed by the packet sub-engine and the further packet sub-engine(s) into a packet flow. For example, a distributor such as distributor 203 in FIG. 2 could be configured to separate each received data packet into parts, and to provide respective parts of each received data packet to the recombiner such as recombiner 210 and to a selected one of the packet sub-engine and the further packet sub-engine(s). In such an embodiment, the recombiner could be configured to recombine the respective parts of each received data packet after processing by the selected one of the packet sub-engine and the further packet sub-engine(s).

In an embodiment according to the example in FIG. 2, the distributor 203 is configured to use a round robin distribution function to distribute the received data packets between the packet sub-engine and the further packet sub-engine(s), which have fixed and equal latencies. The recombiner 210 could be configured to recombine the processed data packets that have been processed by the packet sub-engine and the further packet sub-engine(s) into a packet flow by returning packets to the packet buffer 202 in a sequence in which the processed data packets arrive at the recombiner from the packet sub-engine and the further packet sub-engine(s).

The rates at which received data packets are accepted or admitted for match action processing could be controlled in some embodiments. For example, a packet buffer 152, 202, 302 could be further configured to control a rate at which the received data packets are distributed to the packet sub-engine and the further packet sub-engine(s) in an embodiment that includes multiple packet sub-engines. The packet buffer could be configured to control the rate based on an application associated with the received data packets, for example. A maximum packet rate for an application could be determined based on one or more of: a length of a match action sequence associated with the application, a memory bandwidth requirement for a match action sequence associated with the application, and/or other parameters.

As shown by way of example in FIG. 3, a packet sub-engine could include a packet parser 310 coupled to the packet buffer 302, a key builder 312 coupled to the packet parser and to the memory 320, and an action processor 314 coupled to the key builder. The packet parser 310 is configured to parse contents of the received data packets. The key builder 312 is configured to construct a search key based on the parsed contents of each received data packet and to search the determined look up table for a matching entry for each received data packet. The action processor 314 is configured to perform the one or more packet handling actions from the matching entry on each received data packet.

A multi-pass packet processing method, for which FIG. 5 provides an illustrative example, could include storing received data packets in a packet buffer and determining, by a packet sub-engine that is coupled to the packet buffer, which of a plurality of LUTs is to be searched for a matching entry that matches a received data packet. As described herein, each LUT corresponds to a different type of packet handling action and includes multiple entries, each of which includes a match field and a corresponding collection of one or more packet handling actions specifying how data packets that match the match field are to be handled.

Such a method also involves searching, by the packet sub-engine, the determined LUT for a matching entry (e.g., 508 in FIG. 5), and processing the received data packet, by the packet sub-engine, according to the collection of actions in the matching entry (e.g., 510 in FIG. 5). The packet sub-engine also determines (e.g., 512 in FIG. 5), whether a further LUT is to be searched for a further matching entry. The packet sub-engine provides the processed data packet as an output of the packet sub-engine and match action processing for the packet ends (e.g., 516 in FIG. 5) if a further LUT is not to be searched, and searches the further LUT for a further matching entry and further processes the processed packet according to the collection of actions in the further matching entry (e.g., 514 in FIG. 5) where a further LUT is to be searched for a matching entry.

Determining which of the LUTs is to be searched could be based on one or more of an application identifier and a table identifier associated with the received data packet, as described elsewhere herein.

In some embodiments, a method also involves determining, for each of multiple received data packets associated with multiple, different packet handling applications, which of the LUTs is to be searched.

A method could involve distributing the received data packets between the packet sub-engine and a further packet sub-engine, in the case of a MAP with multiple packet sub-engines.

Such embodiments could additionally involve recombining processed data packets that have been processed by the packet sub-engine and the further packet sub-engine(s) into a packet flow. For example, distributing could involve separating each received data packet into parts and providing a part of each received data packet to a selected one of the packet sub-engine and the further packet sub-engine(s), in which case recombining could involve recombining respective parts of each received data packet after processing by the selected one of the packet sub-engine and the further packet sub-engine(s).

Distributing of received data packets could involve using a round robin distribution function to distribute the received data packets between the packet sub-engine and the further packet sub-engine(s). The packet sub-engine and the further packet sub-engine(s) could have fixed and equal latencies, and the recombining could then involve recombining the processed data packets that have been processed by the packet sub-engine and the further packet sub-engine(s) into a packet flow by returning packets to the packet buffer in a sequence in which the processed data packets are provided from the packet sub-engine and the further packet sub-engine(s) for recombining.

A method could also involve controlling a rate at which the received data packets are distributed to the packet sub-engine and the further packet sub-engine(s). Such controlling could involve controlling the rate based on an application associated with the received data packets, for example. A maximum packet rate for the application could be determined based on any one or more of a length of a match action sequence associated with the application, a memory bandwidth requirement for a match action sequence associated with the application, and/or other parameters.

As shown by way of example in FIG. 5, a method could involve parsing contents of a received data packet at 504, and searching an LUT could involve constructing a search key at 506 based on the parsed contents of the received data packet and searching the determined LUT at 508 for a matching entry based on the search key.

Processing of a received data packet according to the collection of actions in a matching entry could involve either including in the received data packet an indication of the collection of actions in the matching entry or performing the collection of actions on the received data packet. Retrieving and executing microcode as shown at 510 and 514 in FIG. 5 are illustrative of the latter option of performing actions on a data packet.

What has been described is merely illustrative of the application of principles of embodiments of the present disclosure. Other arrangements and methods can be implemented by those skilled in the art.

For example, although described primarily in the context of methods and apparatus, other embodiments could be implemented in the form of a non-transitory processor-readable medium storing instructions which, when executed by one or more processors, cause the one or more processors to perform a method as described herein.

What is claimed is:

1. A multi-pass packet processor comprising:

a memory to store a plurality of look up tables, each look up table corresponding to a different type of packet handling action and comprising a plurality of entries, each of said entries including a match field and a corresponding collection of one or more packet handling actions specifying how data packets that match the match field are to be handled;

a packet buffer to store received data packets;

a packet sub-engine, coupled to the memory and to the packet buffer, to receive the data packets from the packet buffer, to determine for a received data packet which of the plurality of look up tables is to be searched for a matching entry, to search the determined look up table for a matching entry, to process the received data packet according to the collection of actions in the matching entry, to determine whether a further look up table of the plurality of look up tables is to be searched for a further matching entry, and to return the processed data packet to the packet buffer where a further look up table is not to be searched, and to search the further look up table for a further matching entry and further process the processed packet according to the collection of actions in the further matching entry where a further look up table is to be searched for a matching entry;

a further packet sub-engine coupled to the memory, wherein the packet buffer is further configured to control a rate at which the received data packets are distributed to the packet sub-engine and the further packet sub-engine; the rate based on an application associated with the received data packets, wherein a maximum packet rate for the application is determined based on a length of a match action sequence associated with the application.

2. The multi-pass packet processor of claim 1, wherein the packet sub-engine is configured to determine which of the plurality of look up tables is to be searched based on one or more of an application identifier and a table identifier associated with the received data packet.

3. The multi-pass packet processor of claim 1, wherein the packet sub-engine is configured to determine, for each of a plurality of received data packets associated with multiple, different packet handling applications, which of the plurality of look up tables is to be searched.

4. The multi-pass packet processor of claim 1, further comprising:

a distributor, coupled to the packet buffer, to the packet sub-engine and to the further packet sub-engine, to receive the data packets from the packet buffer and to distribute the received data packets between the packet sub-engine and the further packet sub-engine.

5. The multi-pass packet processor of claim 1, further comprising:

a recombiner, coupled to the packet sub-engine and to the further packet sub-engine, to recombine processed data packets that have been processed by the packet sub-engine and the further packet sub-engine into a packet flow.

6. The multi-pass packet processor of claim 5, wherein the distributor is configured to separate each received data packet into parts, and to provide respective parts of each received data packet to the recombiner and to a selected one of the packet sub-engine and the further packet sub-engine, and wherein the recombiner is further configured to recombine the respective parts of each received data packet after processing by the selected one of the packet sub-engine and the further packet sub-engine.

7. The multi-pass packet processor of claim 5,
wherein the distributor is configured to use a round robin distribution function to distribute the received data packets between the packet sub-engine and the further packet sub-engine,
wherein the packet sub-engine and the further packet sub-engine have fixed and equal latencies,
wherein the recombiner is configured to recombine the processed data packets that have been processed by the packet sub-engine and the further packet sub-engine into a packet flow by returning packets to the packet buffer in a sequence in which the processed data packets arrive at the recombiner from the packet sub-engine and the further packet sub-engine.

8. The multi-pass packet processor of claim 1, wherein the maximum packet rate for the application is further determined based on a memory bandwidth requirement for a match action sequence associated with the application.

9. The multi-pass packet processor of claim 1, wherein the packet sub-engine comprises:
a packet parser coupled to the packet buffer;
a key builder coupled to the packet parser and to the memory; and
an action processor coupled to the key builder,
wherein the packet parser is configured to parse contents of the received data packets,
wherein the key builder is configured to construct a search key based on the parsed contents of each received data packet and to search the determined look up table for a matching entry for each received data packet, and
wherein the action processor is configured to perform the one or more packet handling actions from the matching entry on each received data packet.

10. The multi-pass packet processor of claim 1, wherein the packet sub-engine is configured to process the received data packet according to the collection of actions in the matching entry by including in the received data packet an indication of the collection of actions in the matching entry.

11. The multi-pass packet processor of claim 1, wherein the packet sub-engine is configured to process the received data packet according to the collection of actions in the matching entry by performing the collection of actions on the received data packet.

12. A multi-pass packet processing method comprising:
storing received data packets in a packet buffer;
determining, by a packet sub-engine that is coupled to the packet buffer, which of a plurality of look up tables is to be searched for a matching entry that matches a received data packet, each look up table corresponding to a different type of packet handling action and comprising a plurality of entries, each of said entries including a match field and a corresponding collection of one or more packet handling actions specifying how data packets that match the match field are to be handled;
searching, by the packet sub-engine, the determined look up table for a matching entry;
processing, by the packet sub-engine, the received data packet according to the collection of actions in the matching entry;
determining, by the packet sub-engine, whether a further look up table of the plurality of look up tables is to be searched for a further matching entry; and
providing the processed data packet as an output of the packet sub-engine where a further look up table is not to be searched, and searching the further look up table by the packet sub-engine for a further matching entry and further processing the processed packet by the packet sub-engine according to the collection of actions in the further matching entry where a further look up table is to be searched for a matching entry;
distributing the received data packets between the packet sub-engine and a further packet sub-engine;
controlling a rate at which the received data packets are distributed to the packet sub-engine and the further packet sub-engine,
wherein the controlling comprises controlling the rate based on an application associated with the received data packets, wherein a maximum packet rate for the application is determined based on a length of a match action sequence associated with the application.

13. The method of claim 12, wherein determining which of the plurality of look up tables is to be searched comprises determining which of the plurality of look up tables is to be searched based on one or more of an application identifier and a table identifier associated with the received data packet.

14. The method of claim 12, further comprising:
determining, for each of a plurality of received data packets associated with multiple, different packet handling applications, which of the plurality of look up tables is to be searched.

15. The method of claim 12, further comprising:
recombining processed data packets that have been processed by the packet sub-engine and the further packet sub-engine into a packet flow.

16. The method of claim 15,
wherein the distributing comprises separating each received data packet into parts and providing a part of each received data packet to a selected one of the packet sub-engine and the further packet sub-engine,
wherein the recombining comprises recombining respective parts of each received data packet after processing by the selected one of the packet sub-engine and the further packet sub-engine.

17. The method of claim 15,
wherein the distributing comprises using a round robin distribution function to distribute the received data packets between the packet sub-engine and the further packet sub-engine,
wherein the packet sub-engine and the further packet sub-engine have fixed and equal latencies,
wherein the recombining comprises recombining the processed data packets that have been processed by the packet sub-engine and the further packet sub-engine into a packet flow by returning packets to the packet buffer in a sequence in which the processed data packets are provided from the packet sub-engine and the further packet sub-engine for recombining.

18. The method of claim 12, wherein the maximum packet rate for the application is further determined based on a memory bandwidth requirement for a match action sequence associated with the application.

19. The method of claim 12, further comprising:
parsing contents of the received data packet,
wherein the searching comprises constructing a search key based on the parsed contents of the received data packet and searching the determined look up table for a matching entry based on the search key.

20. The method of claim 12, wherein processing the received data packet according to the collection of actions in the matching entry comprises either including in the received data packet an indication of the collection of actions in the matching entry or performing the collection of actions on the received data packet.

\* \* \* \* \*